United States Patent [19]

Petty

[11] 4,426,480

[45] Jan. 17, 1984

[54] ORGANO SILOXANES, METHOD FOR THE PREPARATION THEREOF AND POLYMERIC COMPOSITIONS CONTAINING SAME

[75] Inventor: Herbert E. Petty, Bethel, Conn.

[73] Assignee: Union Carbide Corporation, Danbury, Conn.

[21] Appl. No.: 467,572

[22] Filed: Feb. 17, 1983

Related U.S. Application Data

[63] Continuation of Ser. No. 361,632, Mar. 26, 1982, abandoned.

[51] Int. Cl.³ ............................................. C08K 3/34
[52] U.S. Cl. .................................. 524/445; 525/263; 525/298; 525/315; 525/324; 556/457; 528/24; 528/29; 528/32
[58] Field of Search ................... 556/457; 528/29, 24, 528/32; 524/445; 525/263, 298, 315, 324

[56] References Cited

U.S. PATENT DOCUMENTS 3,624,030 11/1971 Pruvost et al. .
3,843,601 10/1974 Bruner .
3,909,434 9/1975 Brown .
3,956,420 5/1976 Kato et al. .
4,230,820 10/1980 Maschberger et al. .
4,261,848 3/1981 Reedy et al. .

Primary Examiner—Melvyn I. Marquis
Attorney, Agent, or Firm—James C. Arvantes; Robert C. Brown

[57] ABSTRACT

Organo siloxanes which, in conjunction with organic peroxides, serve as vulcanizing or crosslinking agents for polymers, prepared by reacting a fatty alcohol, water and methylvinyldichlorosilane or a mixture of methylvinyldichlorosilane and dimethyldichlorosilane.

21 Claims, No Drawings

ORGANO SILOXANES, METHOD FOR THE PREPARATION THEREOF AND POLYMERIC COMPOSITIONS CONTAINING SAME

This application is a continuation of our prior U.S. application: Ser. No. 361,632, filing date, Mar. 26, 1982 and now abandoned.

SUMMARY OF THE INVENTION

This invention relates to organo siloxanes, prepared by reacting a mixture containing a vinyldichlorosilane, water and a fatty alcohol. The organo siloxanes of this invention can be used as vulcanizing or crosslinking agents for natural and synthetic polymers, in conjunction with organic peroxides.

BACKGROUND OF THE INVENTION

Vinyl silanes such as vinyl-tris(2-methoxyethoxy)silane are used as vulcanizing or crosslinking agents for natural and synthetic polymers. As a rule, the compositions are formulated by admixing the ingredients and compounding the resultant mixtures to a blend at elevated temperatures, below the vulcanization temperature or crosslinking temperature of the composition involved. It has been found, however, that vinyl silanes such as vinyl-tris(2-methoxyethoxy)silane, present in the polymeric compositions, undergo hydrolysis in the compounding step, yielding products which tend to be injurious to humans. Specifically, in the case of vinyl-tris(2-methoxyethoxy)silane, the silane hydrolyzes to 2-methoxyethanol, a volatile product which tends to be toxic to human beings.

DESCRIPTION OF THE INVENTION

The present invention provides organo siloxanes which do not suffer deficiencies previously discussed. The organo siloxanes of this invention can be added to polymeric material, such as ethylene polymers and the resultant compositions compounded to a blend, at elevated temperatures, without undergoing hydrolysis to a toxic, volatile product. The organo siloxanes of this invention, which contain vinyl groups, can be used to vulcanize or crosslink polymers, as will be shown subsequently in this application.

The organo siloxanes of this invention are characterized by Formulas I and II below: (average formulas)

FORMULA I

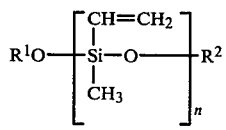

wherein $R^1$ and $R^2$, which can be the same or different, are hydrocarbon radicals, generally having 6 to 18 carbon atoms, preferably 12 to 14 carbon atoms, and n is an integer having a value of 4 to 100, preferably 4 to 16.

FORMULA II

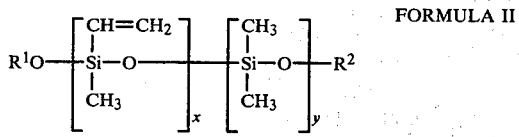

wherein $R^1$ and $R^2$ are as previously defined and x and y, which can be the same or different, are integers having a value of 2 to 50, preferably 2 to 8.

Illustrative of suitable hydrocarbon radicals for $R^1$ and $R^2$ are radicals such as 2-ethylhexyl, octyl, nonyl, decyl, undecyl, dodecyl, stearyl and the like, unsaturated hydrocarbon radicals such as 1-octenyl, dodecenyl and the like.

Among suitable fatty alcohol reactants from which the hydrocarbon radicals derive are: hexyl alcohol, heptyl alcohol, octyl alcohol, nonyl alcohol, dodecyl alcohol, cetyl alcohol, stearyl alcohol and the like.

It may be said, in general, that the preparation of organo siloxanes falling within the scope of Formula I and Formula II can be effected by reacting methylvinyldichlorosilane or a mixture of methylvinyldichlorosilane and dimethyldichlorosilane with water and a fatty alcohol or mixtures of fatty alcohols.

The molar ratios of water and alcohol can be varied with respect to each mole of difunctional chlorosilane such that the following stoichiometric equation holds, wherein for purposes of convenience the reactants are shown to be methylvinyldichlorosilane, water and dodecyl alcohol.

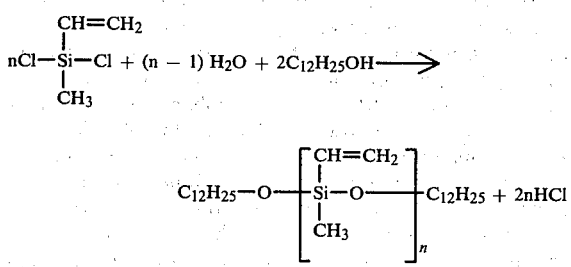

In preparing silanes falling within the scope of Formula II, the amount of methylvinyldichlorosilane (x) plus the amount of dimethyldichlorosilane (y) will be equal to n, according to the following stoichiometric reaction scheme:

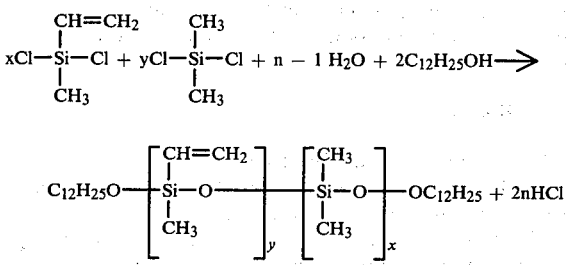

Specifically, the preparation of organo siloxanes falling within the scope of Formula I can be carried out by reacting a mixture of methylvinyldichlorosilane, water and a fatty alcohol, at temperatures below the boiling point of water. It is preferred to conduct the reaction at temperatures below about 15° C. in order that the HCl remain in the reaction mixture and serve as an equilibration catalyst, that is a catalyst which increases the production of linear products.

The amount of fatty alcohol and water used is a stoichiometric amount, that is, an amount sufficient to react with all of the chlorine atoms of the silane.

Preparation of organo siloxanes falling within the scope of Formula II can be carried out at temperatures described above by reacting a mixture of methylvinyldichlorosilane, dimethyldichlorosilane, water and a fatty alcohol wherein the amount of water used, in moles, is n-1 wherein n is equal to the sum of the moles of dimethyldichlorosilane and vinylmethyldichlorosilane.

The number of repeating units of each comonomer can be varied as desired by varying the water to alcohol ratio, with the total water and alcohol content being sufficient to react with all the chlorine atoms.

The reaction itself can be conducted under atmospheric, subatmospheric or superatmospheric pressure, although atmospheric pressure is preferred.

At the completion of the reaction in about 3 hours, hydrogen chloride, which is in the reacted mixture, can be removed by a nitrogen gas sparge at elevated temperatures on the order of about 80° C. to about 90° C. In order to insure removal of hydrogen chloride from the liquid product formed, it is convenient to treat the product with a base such as sodium bicarbonate to form sodium chloride, water and carbon dioxide. Sodium chloride is conveniently removed from the product by filtration.

As previously stated, the organo siloxanes of this invention can be used as vulcanization or crosslinking agents for polymers.

As will be appreciated from the following discussion and examples, a wide variety of polymers such as rubbers, both natural and synthetic, can be vulcanized by the organo siloxane of this invention. Illustrative of such rubbers are the natural rubbers; balata, caoutchouc, caucho gutta percha, gutta-siak, juleting, kickxia, manihot, latex from the Hevea brasiliensis; synthetic diene polymers, such as homo polymers of hydrocarbons containing two unsaturated bonds such as butadiene-1,3; isoprene, 2,3-dimethyl butadiene-1,3 and the like, or copolymers of these with one or more copolymerizable mono-olefinic compounds. Copolymerizable mono-olefinic compounds are organic compounds which contain a single olefinic double bond: >C=C< and which are copolymerizable with butadiene-1,3 hydrocarbons. Such compounds are usually low molecular weight compounds of less than 10 carbon atoms which contain at least two hydrogen atoms and at least one radical other than hydrogen attached to the unsaturated double bond carbon atoms, as in the structure:

where at least one of the disconnected valences is attached to a group other than hydrogen, such as chlorine, alkyl, alkoxy, acyl, cyano or aryl.

Examples of such compounds include styrene, p-methyl styrene, alpha-methyl styrene, p-chloro styrene, vinyl naphthalene and similar aryl olefins and substituted aryl olefins, isobutylene and similar copolymerizable olefinic hydrocarbons, acrylic and substituted acrylic acids and their esters, nitriles and amides such as acrylic acid, acrylonitrile, methacrylonitrile, alpha-chloroacrylonitrile, methyl acrylate, methyl methacrylate, ethyl methacrylate, methyl alpha-chloro acrylate, acrylamide, methacrylamide and the like; vinyl methyl ketone, vinyl methyl ether, vinylidene chloride, N-vinyl carbazole, N-vinyl pyrrolidone and similar copolymerizable compounds containing a single olefinic double bond.

Any rubbery copolymer prepared by the copolymerization of a butadiene-1,3 hydrocarbon and a copolymerizable mono-olefinic compound can be vulcanized by the organo siloxanes of this invention. The rubbery copolymers which are ordinarily employed are copolymers of butadiene-1,3 with a lesser amount of styrene, acrylonitrile or an acrylic ester, or the copolymers of butadiene-1,3 and isobutylene. Such copolymers are known commercially under such names of "Ameripol", "Hycar", "Perbunan", "Buna S", "GR-S", "Chemigun", "Butyl", and "Flexon".

Among other suitable polymeric material which can be crosslinked by the organo siloxanes are ethylene polymers such as normally solid homopolymers of ethylene, copolymers of ethylene and α-olefins and copolymers of ethylene α-olefins and diene monomers. Exemplary of suitable copolymerizable monomers are α-olefins such as propylene, butene-1, hexene-1, and the like; diene monomers such as butadiene, isoprene and the like; wherein the polymers contain at least about 70 percent by weight ethylene.

Preferred copolymers are ethylene-propylene copolymers, ethylene-butene copolymers and the like. These copolymers can be produced under low pressure of about 150 to about 300 psi, using a chromium oxide catalyst modified with titanium as disclosed in U.S. Pat. No. 4,011,382 granted Mar. 8, 1977.

The amount of organo silane plus the amount of organic peroxide used, in formulating the polymeric compositions are sufficient to vulcanize or crosslink the polymers to crosslinked products.

As a general rule, the organo siloxanes are used in amounts of about 0.1 to about 5 percent by weight, preferably about 0.5 to about 2 percent by weight based on the weight of the polymer, with the organic peroxide being present in an amount of about 1 to about 3 percent by weight, preferably in an amount of about 1.5 to about 2 percent by weight, based on the weight of the polymer.

It is to be understood that additives commonly added to polymeric compositions such as fillers such as clay, carbon black, antioxidants and the like can be added to the compositions of this invention, if so desired.

The following examples further illustrate the present invention and are not intended to limit the scope thereof.

EXAMPLE 1

Siloxane-1

Siloxane-1—characterized by gel permeation chromatography and nuclear magnetic resonance spectroscopy as having the average formula:

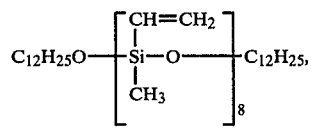

was prepared as follows:

Into a two liter, 3-necked flask equipped with an addition funnel, mechanical stirrer, thermometer and distillation head, with receiver protected by a nitrogen gas by-pass, was added 846.0 g (6.0 moles) of methylvinyldichlorosilane. From the addition funnel, there was added 294.7 g (1.5 moles) of dodecanol to the flask at a moderate rate with stirring. The temperature of the flask decreased to <10° C. due to evolution of HCl. After the dodecanol had been added, 89.7 g (5.0 moles or 95% of the stoichiometric amount) of water were slowly charged from the addition funnel while maintaining the contents of the flask at a temperature of 10±5° C. with an external ice bath. After the water was added, the mixture was held at 15±5° C. for an additional 3 hours with stirring (the HCl equilibration step). The addition funnel was replaced by a N₂-sparge tube and the contents of the flask were slowly heated to 90° C., continuously removing HCl from the flask. After 30 minutes, a sample from the flask was analyzed and found to contain 0.11 meq Cl⁻/g sample. The remaining amount of water (4.5 g, 0.25 mole) was added as a saturated Na₂CO₃ solution. Heating was resumed for an additional 30 minutes at 80° C., continuing the N₂-sparge throughout. The remaining acid chloride was neutralized with damp NaHCO₃. The resultant product was filtered, yielding 759.0 g (theory 792.5 g) 96% of theory of a clear, colorless fluid of 16.5 cstk viscosity (at 25° C.), having a chloride content of 0.01 meq/g (0.04%).

The source of dodecanol used in preparing the siloxanes noted herein was a Procter & Gamble product CO-1214 Fatty Alcohol, a brand name for a mixture containing dodecanol and a small amount of C₁₄ alcohol.

EXAMPLE 2

Siloxane-2

Siloxane-2—characterized by gel permeation chromatography and nuclear magnetic resonance spectroscopy as having the average formula:

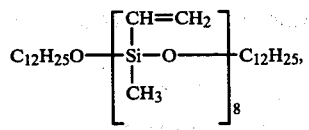

was prepared as follows:

Into a 1 liter, 3-necked flask, equipped with an addition funnel, condenser, mechanical stirrer, thermometer, and protected with a nitrogen gas by-pass, was added 282.0 g (2.0 moles) of methylvinyldichlorosilane. From the addition funnel, there was added 98.25 g (0.5 mole) of dodecanol, slowly with stirring, while maintaining the temperature between 10°-15° C. After the dodecanol had been added, 28.4 g (1.59 moles, 90% of required stoichiometry of 1.75 moles) of water were added with stirring, maintaining a temperature between 10°-15° C. on the reaction vessel by means of an ice bath. The contents of the flask were stirred for 3 hours at a temperature between 10°-15° C. The addition funnel was replaced by a tube inserted into the liquid reaction mixture and nitrogen was passed through the mixture while heating to a temperature of 90° C. with stirring to remove hydrogen chloride from the flask. After 0.5 hour at a temperature of 90° C., the remaining stoichiometric quantity of water (3.1 g) was added as saturated Na₂CO₃. All residual hydrogen chloride was then neutralized as described for the preparation of Siloxane-1. After filtration, 250 g of a clear, colorless fluid of 18.4 cstk (25° C.) viscosity were obtained.

EXAMPLE 3

Siloxane-3

Siloxane-3—characterized by gel permeation chromatography and nuclear magnetic resonance spectroscopy as having the average formula:

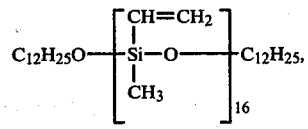

was prepared following the procedure described with respect to Siloxane-1, by reacting 282.0 g (2 moles) methylvinyldichlorosilane, 46.6 g (0.25 mole) dodecanol and 33.75 g (1.875 moles) H₂O to produce 178.5 g of a clear, colorless fluid.

EXAMPLE 4

Siloxane-4

Siloxane-4—characterized by gel permeation chromatography and nuclear magnetic resonance spectroscopy as having the average formula:

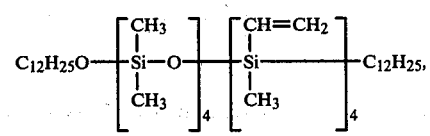

was prepared by following the procedure described with respect to Siloxane-1, by reacting 141.09 (1.0 mole) methylvinyldichlorosilane, 129.1 g (1.0 mole) dimethyldichlorosilane, 93.29 (0.5 mole) dodecanol and 31.5 g (1.75 moles) water to produce 193.5 g of a clear, colorless fluid.

The following examples illustrate the ability of the siloxanes to vulcanize rubber.

Compositions were formulated by admixing the components, with the exception of the peroxide, in a Banbury mixer at a temperature and for a period of time to insure thorough mixing. The compositions were sheeted on a two roll mill wherein the peroxides were added. Each composition was then molded into test plaques according to the procedure described in ASTM test D-15-72 and then vulcanized in a heated press under pressure for 20 minutes at a temperature of 340° F. Tests to which the specimens were subjected and results thereof are set forth in Table 1. These results establish the improvement in physical properties of the compositions of this invention which contain the claimed siloxanes.

TABLE 1

|  | Example 5 | Example 6 | Example 7 | Example 8 | Control 1 | Control 2 |
| --- | --- | --- | --- | --- | --- | --- |
| Ethylene-Propylene Copolymer (Vistalon 404-Sold by Exxon Company) | 100 | 100 | 100 | 100 | 100 | 100 |
| Siloxane-1 | 0.5 | 1.0 | 0.5 | 1.0 | — | — |
| Poly-2,2,4-trimethyl-1,2-dihydroxy-quinoline (antioxidant) | 1.5 | 1.5 | 1.5 | 1.5 | 1.5 | 1.5 |
| Zinc Oxide | 5 | 5 | 5 | 5 | 5 | 5 |
| Carbon Black | 2 | 2 | 2 | 2 | 2 | 2 |

TABLE 1-continued

| | Example 5 | Example 6 | Example 7 | Example 8 | Control 1 | Control 2 |
|---|---|---|---|---|---|---|
| Vulcup-R α,α'-bis-(t-butylperoxy) disopropylbenzene | 2 | 2 | 2 | 2 | 2 | 2 |
| Clay-(Translink 37-Sold by Freeport Kaolin Company) | 110 | 110 | — | — | 110 | — |
| Clay-(Burgess KE-Sold by Burgess Pigment Company) | — | — | 110 | 110 | — | 110 |
| Hardness, Shore A ASTM-D-2240-68 | 62 | 62 | 62 | 62 | 61 | 61 |
| Elongation, Percent ASTM-D-412-68 | 540 | 460 | 390 | 360 | 610 | 430 |
| 300 Percent Modulus, psi ASTM-D-412-68 | 780 | 920 | 970 | 1040 | 710 | 830 |
| Tensile Strength, psi ASTM-D-412-68 | 910 | 1030 | 1040 | 1080 | 860 | 950 |
| Set at Break, Percent ASTM-D-412-68 | 25 | 15 | 15 | 15 | 35 | 20 |

What is claimed is:

1. An organo siloxane having the average formula:

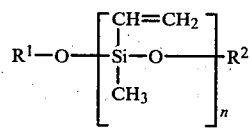

wherein $R^1$ and $R^2$ are hydrocarbon radicals having 6 to 18 carbon atoms and n is an integer having a value of 2 to 50; or having the average formula:

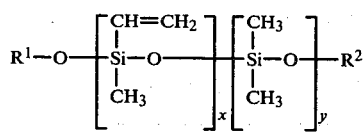

wherein $R^1$ and $R^2$ are as previously defined and x and y are integers each having a value of 2 to 50.

2. An organo siloxane having the average formula:

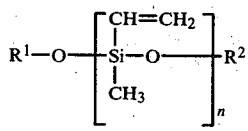

wherein $R^1$ and $R^2$ are hydrocarbon radicals having 6 to 18 carbon atoms and n is n integer having a value of 2 to 50.

3. An organo siloxane having the average formula:

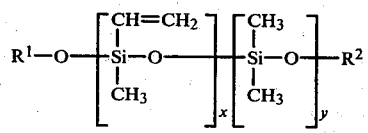

wherein $R^1$ and $R^2$ are hydrocarbon radicals having 6 to 18 carbon atoms and x and y are integers each having values of 2 to 50.

4. An organo siloxane having the average formula:

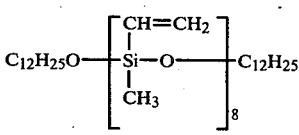

5. An organo siloxane having the average formula:

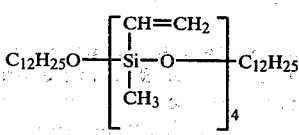

6. An organo siloxane having the average formula:

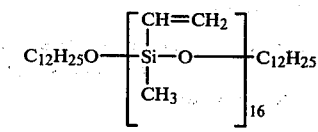

7. An organo siloxane having the average formula:

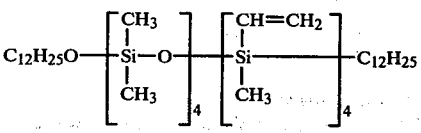

8. A polymeric composition containing an organic peroxide and an organo siloxane as defined in claim 1.

9. A polymeric composition containing an organic peroxide, filler and an organo siloxane as defined in claim 1.

10. A polymeric composition as defined in claim 9 wherein the filler is clay.

11. A method of producing an organo siloxane as defined in claim 1 which comprises reacting a mixture containing water, a fatty alcohol and methylvinyldichlorosilane or a mixture of methylvinyldichlorosilane and dimethyldichlorosilane.

12. A method as defined in claim 11, conducted at temperatures below about 15° C.

13. A polymeric composition comprising an ethylene polymer, an organic peroxide and an organo silane as defined in claim 1.

14. A polymeric composition comprising an ethylene polymer, an organic peroxide and an organo silane as defined in claim 2.

15. A polymeric composition comprising an ethylene polymer, an organic peroxide and an organo silane as defined in claim 3.

16. A polymeric composition comprising an ethylene polymer, an organic peroxide and an organo silane as defined in claim 4.

17. A polymeric composition comprising an ethylene polymer, an organic peroxide and an organo silane as defined in claim 5.

18. A polymeric composition comprising an ethylene polymer, an organic peroxide and an organo silane as defined in claim 6.

19. A polymeric composition comprising an ethylene polymer, an organic peroxide and an organo silane as defined in claim 7.

20. A polymeric composition as defined in claim 13 wherein the ethylene polymer is a copolymer of ethylene and propylene.

21. The cured product of the composition defined in claim 8.

* * * * *

UNITED STATES PATENT AND TRADEMARK OFFICE
CERTIFICATE OF CORRECTION

PATENT NO. : 4,426,480

DATED : January 17, 1984

INVENTOR(S) : Herbert E. Petty

It is certified that error appears in the above—identified patent and that said Letters Patent is hereby corrected as shown below:

Column 1, line 6, "our" should read -- my --

Column 3, line 34, before "isoprene" delete the semicolon and insert a comma

Column 4, lines 7-8, "Chemigun" should read -- "Chemigum" --

Column 4, line 13, after "ethylene" insert a comma

Column 4, line 39, "such as clay" should read -- e.g. clay --

Table 1, at columns 7 and 8, under Vulcup R, "disopropylbenzene" should read -- diisopropylbenzene --

Claim 2, penultimate line, "n integer" should read -- an integer --

Claim 13, line 2, "silane" should read -- siloxane --

Claim 14, line 2, "silane" should read -- siloxane --

Claim 15, line 2, "silane" should read -- siloxane --

Claim 16, line 2, "silane" should read -- siloxane --

Claim 17, line 2, "silane" should read -- siloxane --

Claim 18, line 2, "silane" should read -- siloxane --

Claim 19, line 2, "silane" should read -- siloxane --

UNITED STATES PATENT AND TRADEMARK OFFICE
CERTIFICATE OF CORRECTION

PATENT NO. : 4,426,480

DATED : January 17, 1984

INVENTOR(S) : Herbert E. Petty

It is certified that error appears in the above-identified patent and that said Letters Patent is hereby corrected as shown below:

Claim 19, line 2, "silane" should read -- siloxane --.

Signed and Sealed this

Eighth Day of May 1984

[SEAL]

Attest:

GERALD J. MOSSINGHOFF

Attesting Officer    Commissioner of Patents and Trademarks

UNITED STATES PATENT AND TRADEMARK OFFICE
CERTIFICATE OF CORRECTION

PATENT NO. : 4,426,480
DATED : January 17, 1984
INVENTOR(S) : Herbert E. Petty

It is certified that error appears in the above-identified patent and that said Letters Patent is hereby corrected as shown below:

Column 2, line 38          "silanes" should read -- siloxanes --

Column 2, lines 49-54      The formula of the siloxane should read:

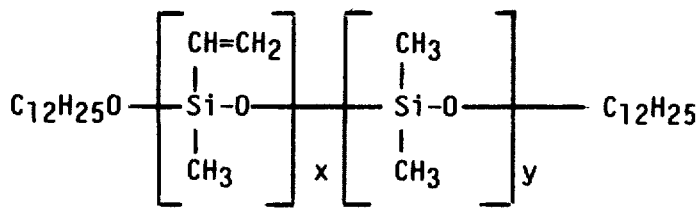

Column 3, line 29          "siloxane" should read -- siloxanes --

Column 3, line 49          "where" should read -- wherein --

UNITED STATES PATENT AND TRADEMARK OFFICE
CERTIFICATE OF CORRECTION

PATENT NO. : 4,426,480

DATED : January 17, 1984

INVENTOR(S) : Herbert E. Petty

It is certified that error appears in the above-identified patent and that said Letters Patent is hereby corrected as shown below:

| | |
|---|---|
| Column 4, line 26 | "silane" should read -- siloxane -- |
| Column 6, line 39 | "141.09" should read -- 141.09 g -- |
| Column 6, line 41 | "93.29" should read -- 93.29 g -- |
| Claim 1, second and third line after the first formula: | "2 to 50 " should read -- 4 to 100 -- |
| Claim 2, second and third line after the first formula | "2 to 50 " should read -- 4 to 100 -- |

Signed and Sealed this

Twenty-fourth Day of September 1985

[SEAL]

Attest:

Attesting Officer

DONALD J. QUIGG

Commissioner of Patents and
Trademarks—Designate